United States Patent [19]

Cargle et al.

[11] 4,444,654

[45] Apr. 24, 1984

[54] METHOD FOR THE RESOLUTION OF ENHANCED OIL RECOVERY EMULSIONS

[75] Inventors: Virgil H. Cargle, Houston; Donald L. Shaw, Kingwood, both of Tex.

[73] Assignee: Exxon Research & Engineering Co., Florham Park, N.J.

[21] Appl. No.: 528,394

[22] Filed: Sep. 1, 1983

[51] Int. Cl.$^3$ .................... C10G 33/00; C10G 33/04; E21B 43/00

[52] U.S. Cl. .................... 208/188; 208/187; 210/729; 210/708; 210/735; 210/737; 166/267

[58] Field of Search ............. 208/188, 187; 210/729, 210/708, 735, 737; 166/267

[56] References Cited

U.S. PATENT DOCUMENTS

| | | | |
|---|---|---|---|
| 3,316,181 | 4/1967 | Sackis | 252/344 |
| 4,029,570 | 6/1977 | Coffman et al. | 208/188 |
| 4,109,718 | 8/1978 | Burton | 166/267 |
| 4,261,812 | 4/1981 | Newcombe | 166/267 |
| 4,374,734 | 2/1983 | Newcombe | 208/188 |
| 4,384,950 | 6/1983 | McCoy | 208/188 |
| 4,392,944 | 7/1983 | Kessick | 210/708 |
| 4,405,015 | 9/1983 | McCoy | 166/267 |

FOREIGN PATENT DOCUMENTS

| | | | |
|---|---|---|---|
| 80582 | 2/1961 | France | 208/188 |
| 941887 | 11/1963 | United Kingdom . | |
| 263793 | 6/1970 | U.S.S.R. | 208/188 |
| 268580 | 7/1970 | U.S.S.R. | 208/188 |
| 734245 | 5/1980 | U.S.S.R. . | |

OTHER PUBLICATIONS

*Emulsions Theory and Practice*, Paul Becher, p. 178, 1-29-83, (TP 156 E6B4e), 1957, Reinhold Pub. Co.

Primary Examiner—Delbert E. Gantz
Assistant Examiner—Helane E. Maull
Attorney, Agent, or Firm—Roland A. Dexter

[57] ABSTRACT

An oil-in-water emulsion of crude oil, water and hydrophilic surfactant is resolved by first heating said emulsion until it separates into a surfactant laden water layer and an oil-rich emulsion layer, removing the water layer from the oil-rich emulsion layer, treating the emulsion layer by the addition of from 20 to 40 volume percent of water containing a demulsifier and recovering the crude oil which separates from the water upon standing.

4 Claims, No Drawings

4,444,654

METHOD FOR THE RESOLUTION OF ENHANCED OIL RECOVERY EMULSIONS

This invention relates to the recovery of petroleum from underground reservoirs and pertains in particular to the resolution of emulsions of crude oil and water that are recovered from a producing well of a reservoir subjected to enhanced oil recovery techniques.

BACKGROUND OF THE INVENTION

Recovered liquid from a producing well can be in the form of oil and water emulsions which are quite stable, especially when they contain a hydrophilic surfactant which was introduced intor the reservoir for enhancing the recovery of crude oil. Surfactants are added to a reservoir in the form of a solution or dispersion which is either miscible with the crude oil or lowers the surface tension between the water and oil phases encountered in the formation. Frequently, thickened water is injected into a reservoir to displace crude oil to a producing well. These ingredients, surfactant, oil, water and thickening agents produce very stable emulsions.

It is anticipated that in most enhanced recovery processes significant amounts of water will be produced, as well as oil. This is because all easily recoverable oil has usually been removed from a reservoir, usually by water flooding, before an enhanced recovery process is begun. Breaking of emulsions produced in a tertiary recovery operation will be difficult because the surface active agents will not only encourage the formation of emulsions, but tend to stabilize them. Further, there will not be very much oil in most of these emulsions; from 1 to 30 LV% oil may be expected, with 5 to 20 LV% oil being most commonly encountered.

Because of the amounts of oil and water, the produced emulsion will be an oil-in-water (o/w) emulsion. These emulsions are not usually encountered in petroleum production where they are normally water-in-oil (w/o) emulsions. Conventional emulsion breaking techniques which work on a w/o emulsion are ineffective in breaking an o/w emulsion.

One approach to breaking an oil-in-water emulsion of the type described above is given in U.S. Pat. Nos. 4,029,570 and 4,261,812 wherein additional surface active material may be added to the emulsion prior to its breaking which breaking can be caused by the addition of formation brine or a conventional demulsifier.

British Pat. No. 941,887 describes a multi-stage emulsion resolution approach in which the emulsion is in a first zone partially demulsified by chemical, electrical or thermal means and thereafter dehydrated chemically, thermally or electrically in a second zone. The resolution process provides for desalting in the second zone by adding fresh water to the partially demulsified emulsion prior to its dehydration.

A USSR Pat. No. 734,245 discloses the resolution of oil water emulsions by (a) partially resolving the emulsion with an aqueous demulsifier, (b) heating, (c) draining off the water, and (d) adding more water and demulsifier.

It would be useful if a process were provided to resolve these enhanced oil recovery emulsions and produce an oil of reduced water content by a technique which required the addition of less demulsifier.

It is an object of this invention to provide a process for the resolution of oil-in-water emulsions obtained from enhanced oil recovery techniques which is simple and requires less demulsifier.

SUMMARY OF THE INVENTION

It has been discovered that from 1/10 to 1/20 of the normally requisite amount of demulsifier provokes resolution of an emulsion stream obtained from enhanced oil (tertiary) treatment of a reservoir when the stream is first heated to a temperature that separates it into an oil-rich emulsion layer and a surfactant laden water layer and thereafter the oil-rich emulsion layer is treated with 20 to 40 volume percent of water and the demulsifier. The preferred demulsifier is a cationic polyamine or a polyquaternary amine.

In accordance with this invention in a process for recovering crude oil from an oil-in-water emulsion of crude oil, water and hydrophilic surface active agents produced from a reservoir wherein the emulsion is contacted with an emulsion breaking reagent, there is provided an improvement comprising first heating the emulsion until it separates into a surfactant laden water layer and an oil-rich emulsion layer, thereafter removing the water layer from the oil-rich emulsion layer and finally adding said emulsion breaking reagent to said oil-rich emulsion layer while treating said layer with from 20 to 40 volume percent of water.

The heating is preferably carried out at from 35° C. to 70° C. and the demulsifier reagent is present in an amount ranging from 125 ppm to 1000 ppm based on the weight of said oil-rich emulsion layer which layer contains from 55 to 95, more usually 70 to 45, liquid volume % at ambient temperature (LV%) of oil.

DETAILED DESCRIPTION OF THE INVENTION

The emulsions which can be treated in the practice of the present invention are any oil-in-water emulsions characterized by the presence of hydrophilic surface active agents. These emulsions may contain 1 to 30 LV% oil with the remainder being water. Surfactant concentration may range from 50 ppm to 5.0 wt%, based on the total weight of the emulsion. The surfactants normally used in the practice of enhanced recovery processes are typically sulfonates. Sodium petroleum sulfonates are especially preferred because of their effectiveness, ready availability, and ease of molecular weight adjustment.

Other materials which may be present in the produced emulsions are various thickening agents such as biopolymers or synthetic polymers, e.g. polyacrylamides. Electrolytes or salts may be present either because they were added to fluids pumped into the formation or were present in the connate water. Co-surfactants such as alcohols, alkylethoxy sulfates, and alkylcellosolves may be encountered as well. None of the materials mentioned in this paragraph are individually needed for a tertiary recovery process, though they are frequently encountered. When encountered, tney may produce emulsions which are difficult to break.

The emulsion breaking process of the present invention may be practiced either in batch fashion or continuously. First of all there must be provided a heated holding tank providing a residence time sufficiently long to elevate the temperature of the produced oil-in-water emulsion to that ambient condition which produces an oil-rich, i.e. from 55 to 95, more usually 75 to 85, LV% oil, emulsion layer which can be separated from the surfactant laden water layer (a layer containing less than 0.01 LV% oil). It has been found that a temperature of from 35° C. to 70° C. provides such an ambient condition. Residence times of from 1 to 24, usually 2 to 8, hours is appropriate. The next step is to separate the oil-rich emulsion layer from the water layer which is readily accomplished with upper and lower transfer valves, respectively.

The oil-rich emulsion layer is thereafter treated with from 20 to 40 volume percent of water (either fresh or produced water) and a demulsifier. The treatment provokes resolution of the emulsion with from 125 to 800 ppm of the demulsifier. In a period of from 1 to 24 hours upon standing at ambient temperatures, the treated system resolves into an oil layer containing from 0.1 to 1, more preferably less than 0.3, LV% water. This oil layer is then readily piped to a holding tank for eventual transport to a refinery.

The demulsifiers are those water soluble cationic polyamines and polyquaternary amines conventionally used for demulsification of production emulsion streams in the oil patch. Conventionally, demulsifier formulations are specific to a particular field and thus are formulated on location. In the practice of this inventive process, the choice and formulation of specific demulsifier which functions as the emulsion breaking agent(s) would be made accordingly.

Batch operation is relatively simple and requires little extra equipment, merely two large holding series connected tanks with a heater for the first and metering means for introducing the water and demulsifier in the second. Continuous operation is preferred but would require a much more elaborate equipment layout than could be provided at most producing wells, e.g. a heated emulsion holding tank, metering pumps for the water demulsifier, settling tank for emulsion breaking and associated hardware and pumps for transferring fluid from one step to another. The continuous process may be preferred in flooded relatively large or giant fields.

The invention will be further understood by reference to the following Example which illustrates the best mode of the invention.

EXAMPLE

An oil-in-water emulsion containing about 86% water, an alkoxylated sulfated tridecyl alcohol surfactant (typically a concentration level of 0.46 gm/100 ml.) and chlorides (typically about 5 wt%) produced from a microemulsion flood pilot test in December 1980 was heated for 8 hours at 60° C. The oil-rich layer containing some surfactant was separated after cooling to ambient temperature from the water layer containing surfactant which water layer amounted to 82 LV%. The oil-rich layer (18 LV%) was injected and admixed with 20 LV% (based on the volume of the oil-rich layer) of fresh water and 800 ppm of Bufloc 160 (a cationic polyquaternary amine demulsifier) sold by Buckman Lab. of Memphis, Tenn. After 3 hours at ambient temperature, the oil layer containing 0.2 LV% water was removed to a holding tank and thereby separated from the water layer.

The invention in its broader aspect is not limited to the specific details shown and described and departures may be made from such details without departing from the principles of the invention and without sacrificing its chief advantages.

What is claimed is:

1. In a process for recovering crude oil from an oil-in-water emulsion of crude oil, water and hydrophilic surface active agents produced from a reservoir wherein the emulsion is contacted with an emulsion breaking reagent, the improvement comprising a first step consisting essentially of heating the emulsion until it separates into a surfactant laden water layer and an oil-rich emulsion layer, a second step of thereafter removing the water layer from the oil-rich emulsion layer and finally adding said emulsion breaking reagent to said oil-rich emulsion layer while treating said layer with from 20 to 40 volume percent of water.

2. Process of claim 1 wherein said emulsion breaking reagent is a cationic polyquaternary amine demulsifier.

3. Process of claim 1 wherein said heating is at from 350° C. to 70° C. and said reagent is present in an amount ranging from 125 ppm to 1000 ppm based on the weight of said emulsion layer.

4. Process of claim 1 wherein the produced emulsion contains 1 to 30 LV% oil and 0.005 to 5 grams of surfactant per 100 ml of emulsion.

* * * * *